United States Patent
Quy et al.

(10) Patent No.: US 12,021,208 B2
(45) Date of Patent: Jun. 25, 2024

(54) BATTERY PACK MODULE

(71) Applicant: GM GLOBAL TECHNOLOGY OPERATIONS LLC, Detroit, MI (US)

(72) Inventors: Ethan T. Quy, Royal Oak, MI (US); Nicholas R. Bratton, Royal Oak, MI (US); Harikrishna Ketha, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 447 days.

(21) Appl. No.: 17/027,967

(22) Filed: Sep. 22, 2020

(65) Prior Publication Data
US 2022/0093989 A1 Mar. 24, 2022

(51) Int. Cl.
| | |
|---|---|
| *H01M 10/6554* | (2014.01) |
| *H01M 10/613* | (2014.01) |
| *H01M 10/625* | (2014.01) |
| *H01M 10/6556* | (2014.01) |
| *H01M 10/6568* | (2014.01) |
| *H01M 50/20* | (2021.01) |

(52) U.S. Cl.
CPC ..... *H01M 10/6554* (2015.04); *H01M 10/613* (2015.04); *H01M 10/625* (2015.04); *H01M 10/6556* (2015.04); *H01M 10/6568* (2015.04); *H01M 50/20* (2021.01); *H01M 2220/20* (2013.01)

(58) Field of Classification Search
CPC ......... H01M 10/6554; H01M 10/6556; H01M 10/6568; H01M 10/613; H01M 10/625; H01M 2220/20; H01M 50/20; Y02E 60/10
See application file for complete search history.

(56) References Cited

U.S. PATENT DOCUMENTS

| | | | |
|---|---|---|---|
| 9,640,844 B2 | 5/2017 | Kawaguchi et al. | |
| 10,892,528 B2 | 1/2021 | Yoo et al. | |
| 11,075,415 B2 | 7/2021 | Kalmbach et al. | |
| 11,390,175 B2 | 7/2022 | Janzen et al. | |
| 11,811,039 B2 | 11/2023 | Murayama et al. | |
| 2011/0151298 A1* | 6/2011 | Kim | H01M 50/249 429/100 |
| 2016/0043451 A1* | 2/2016 | Kawaguchi | B60K 11/02 429/62 |
| 2016/0276722 A1* | 9/2016 | Ho | F16B 3/005 |
| 2018/0241103 A1* | 8/2018 | Pfeiff | H01M 10/6554 |

(Continued)

FOREIGN PATENT DOCUMENTS

| | | |
|---|---|---|
| CN | 105075001 A | 11/2015 |
| CN | 108140915 A | 6/2018 |

(Continued)

OTHER PUBLICATIONS

Chinese Application No. 202110525172.0 filed May 14, 2021; Chinese Office Action dated Nov. 29, 2023; 11 pages.

*Primary Examiner* — Stewart A Fraser
*Assistant Examiner* — Lilia Nedialkova
(74) *Attorney, Agent, or Firm* — CANTOR COLBURN LLP

(57) ABSTRACT

A battery pack module includes a cooling plate having thermal breaks strategically aligned with respect to adjacent cell chambers to reduce thermal propagation from one cell chamber to an adjacent cell chamber via thermal conductance through the cooling plate.

18 Claims, 5 Drawing Sheets

(56) References Cited

U.S. PATENT DOCUMENTS

| | | | |
|---|---|---|---|
| 2018/0294452 A1* | 10/2018 | Tan | H01M 10/6568 |
| 2019/0348726 A1* | 11/2019 | Marpu | H01M 50/20 |
| 2020/0058974 A1 | 2/2020 | Lim et al. | |
| 2020/0358058 A1* | 11/2020 | Murayama | H01M 10/6554 |
| 2021/0083343 A1* | 3/2021 | West | H01M 10/6568 |

FOREIGN PATENT DOCUMENTS

| | | | |
|---|---|---|---|
| CN | 108461862 A | 8/2018 | |
| CN | 208401004 U | 1/2019 | |
| CN | 110838605 A | 2/2020 | |
| CN | 110867542 A | 3/2020 | |
| CN | 111033880 A | 4/2020 | |
| CN | 111354887 A | 6/2020 | |
| KR | 20200104620 A | 9/2020 | |
| WO | WO-2019151036 A1 * | 8/2019 | H01M 10/647 |

* cited by examiner

BATTERY PACK MODULE

INTRODUCTION

High capacity battery packs are utilized in many consumer and industrial sectors categorically including transportation and power grid applications. High capacity battery packs are known to include a plurality of battery pack modules allowing for flexibility in configurations and adaptation to application requirements. For example, in automotive uses, battery packs may be modular to the extent that the number of battery modules may be varied to accommodate a desired energy density or range objective of a particular vehicle platform, intended use, or cost target.

SUMMARY

In one exemplary embodiment, a battery pack module may include a plurality of cell chambers having space for cells wherein adjacent ones of the cell chambers are separated by a respective thermal barrier. Each cell chamber may contain at least one cell. The battery pack module may also include a heat sink partially defining the cell chambers and thermally coupled with each cell. The heat sink may include a thermal break in regions between adjacent cell chambers.

In addition to one or more of the features described herein, the heat sink may include a fluid circulating cooling plate.

In addition to one or more of the features described herein, the fluid circulating cooling plate may include fluid channels, wherein the thermal break in regions between adjacent cell chambers may include a thermal break in regions between adjacent ones of the fluid channels.

In addition to one or more of the features described herein, the at least one cell may include at least one of a pouch cell, a prismatic cell and a cylindrical cell.

In addition to one or more of the features described herein, the thermal barrier may include an aerogel.

In addition to one or more of the features described herein, the thermal break may include a void in the heat sink in regions between adjacent cell chambers.

In addition to one or more of the features described herein, the thermal break may include a void in the cooling plate in regions between adjacent cell chambers.

In addition to one or more of the features described herein, the thermal break may include a void in the cooling plate in regions between adjacent ones of the fluid channels.

In addition to one or more of the features described herein, the battery pack module may include a carrier secured to the fluid circulating cooling plate in regions between adjacent ones of the fluid channels adjacent the thermal breaks.

In addition to one or more of the features described herein, a thermal adhesive may bond the heat sink with each cell.

In another exemplary embodiment, a battery pack module may include a pair of opposing sidewalls partially defining therebetween a cell containment bay. The battery pack module may include a heat sink having a thermally conductive material including a first surface partially defining the cell containment bay between the opposing sidewalls. The heat sink may have a plurality of material voids. The battery pack module may include a carrier located on a side of the heat sink opposite the cell containment bay and secured to the heat sink adjacent the material voids. The carrier may have a pair of opposing attachment extensions wrapping outside surfaces of the opposing sidewalls and engaged thereto.

In addition to one or more of the features described herein, the cell containment bay may include a plurality of cell chambers, wherein adjacent ones of the cell chambers are separated by a respective thermal barrier. The material voids may correspond to regions between adjacent cell chambers.

In addition to one or more of the features described herein, the heat sink may include a fluid circulating cooling plate.

In addition to one or more of the features described herein, the fluid circulating cooling plate may include fluid channels, wherein the material voids may be in regions between adjacent ones of the fluid channels.

In addition to one or more of the features described herein, the thermal barrier may include an aerogel.

In addition to one or more of the features described herein, a structural adhesive may secure the carrier to the heat sink.

In yet another exemplary embodiment, a battery pack module may include a pair of opposing sidewalls partially defining therebetween a cell containment bay, and a cooling plate partially defining the cell containment bay between the opposing sidewalls. The cooling plate may include a tray having a bottom and a peripheral raised lip, a plurality of first elongate ribs rising from the bottom of the tray, the first elongate ribs including slots therethrough. The cooling plate may include a thermally conductive closeout plate having an outer surface and complementarily shaped inner surfaces interfacing with the tray at the peripheral raised lip and the first elongate ribs. The closeout plate may include slots through the closeout plate substantially aligned with the slots through the first elongate ribs of the tray. The cooling plate may include fluid impervious seals at the interfaces of the inner surfaces of the closeout plate and the peripheral raised lip and the first elongate ribs of the tray.

In addition to one or more of the features described herein, the cooling plate may include the tray having a plurality of second elongate ribs interposed adjacent ones of the first elongate ribs and rising from the bottom of the tray. The thermally conductive closeout plate may include complementarily shaped inner surfaces interfacing with the tray at the second elongate ribs. The cooling plate may include fluid impervious seals at the interfaces of the inner surfaces of the closeout plate and the second elongate ribs of the tray.

In addition to one or more of the features described herein, the tray and the closeout plate may be metal and the fluid impervious seals may be braze joints.

In addition to one or more of the features described herein, the cell containment bay may include a plurality of cell chambers, wherein adjacent ones of the cell chambers are separated by a respective thermal barrier, the thermal barriers being aligned with the slots through the closeout plate and the first elongate ribs of the tray.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
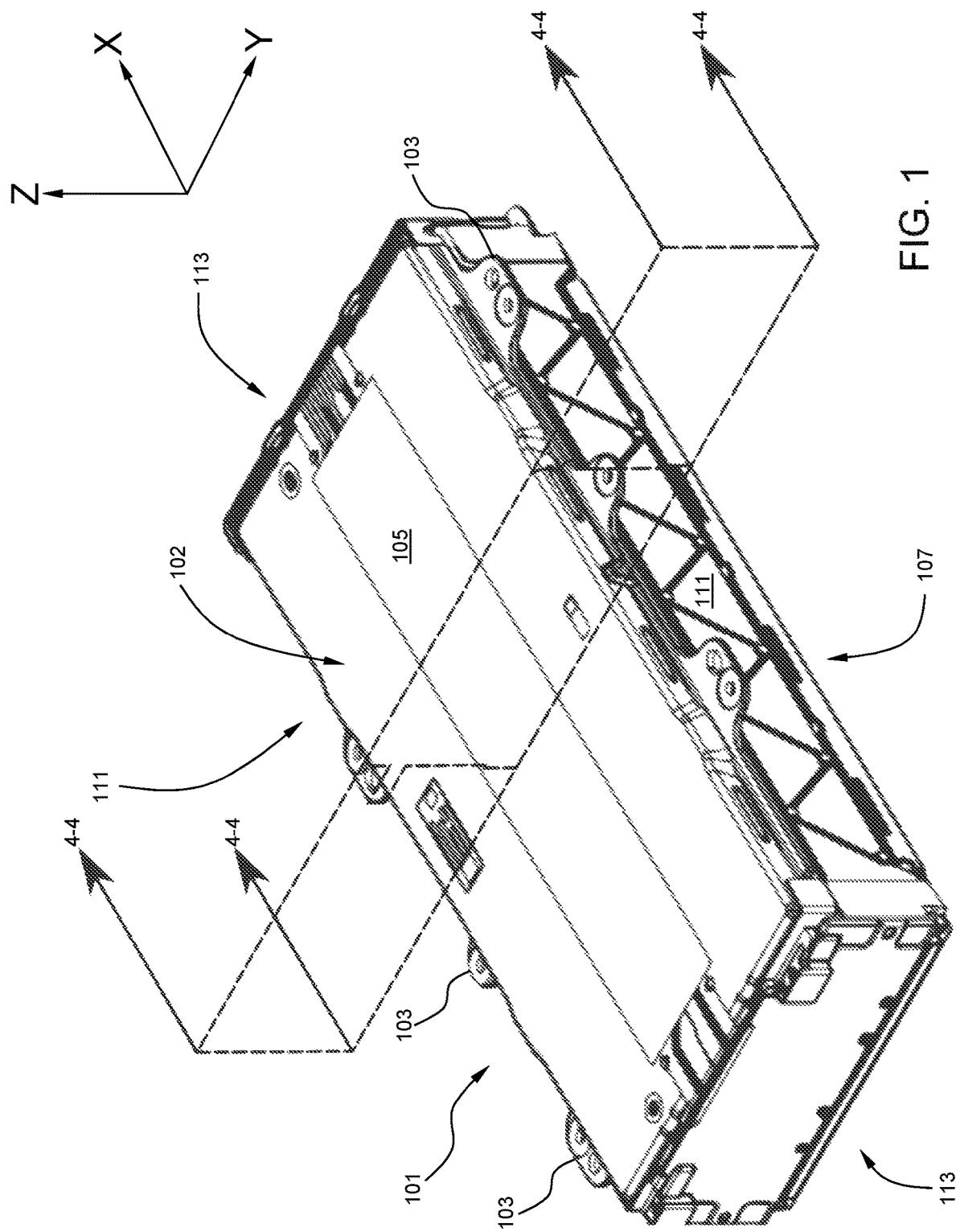
FIG. 1 illustrates a view of an exemplary battery pack module, in accordance with the present disclosure.

The following description is merely exemplary in nature and is not intended to limit the present disclosure, its application or uses. Throughout the drawings, corresponding reference numerals indicate like or corresponding parts and features.

FIG. 1 illustrates an exemplary battery module 101, which may be one of a number of similar battery modules included in, for example, a battery electric vehicle battery pack. In such application context, the Y-axis may correspond directionally to a vehicle longitudinal orientation (i.e. front-to-back), the X-axis may correspond to a vehicle lateral or transverse orientation (i.e. side-to-side), and the Z-axis may correspond to a vehicle vertical orientation (i.e. top-to-bottom). Such an exemplary battery pack module of course may find application outside of battery electric vehicles, for example in on and off grid power quality and storage applications, in other pack combinations or as a stand-alone battery module.

Battery pack module 101 may be substantially rectangular as illustrated having a top 105 and opposing bottom 107, opposing sides 111, and opposing ends 113 which generally define an enclosure 102 which may provide structure, mounting features, interfaces, and containment of battery pack module 101 components and systems, for example. As used herein, side, top, bottom and end may be interchangeably used to refer to orientation or enclosure 102 components, a particular usage being obvious to one having ordinary skill in the art in the context of the disclosure. A plurality of mounting ears 103 extend outwardly from the side walls 111 for structurally securing the battery pack module 101 to structural rails within a battery pack enclosure, for example.

Figure 2:
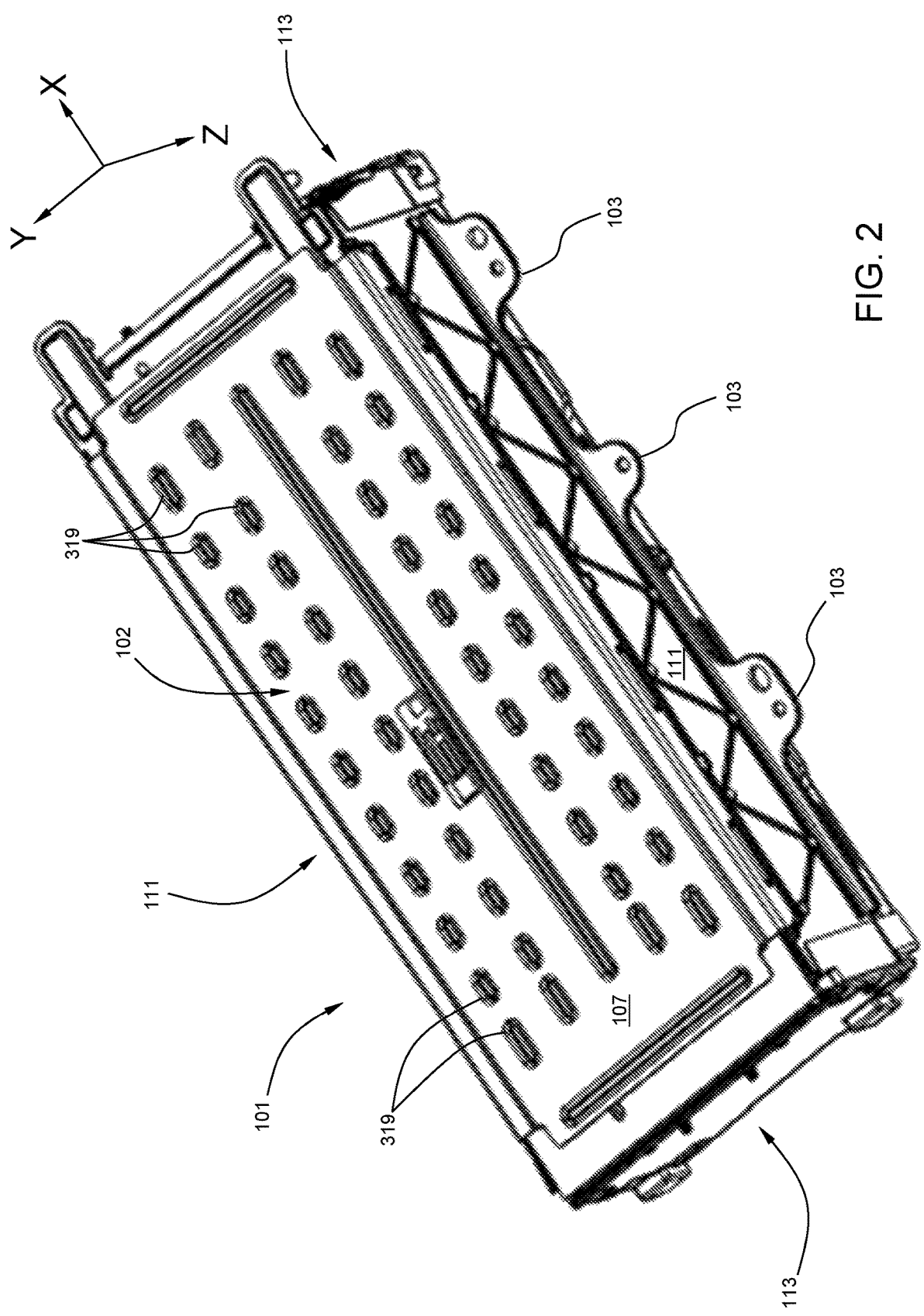
FIG. 2 illustrates a view of an exemplary battery pack module, in accordance with the present disclosure.

FIG. 2 provides an alternate view of the exemplary battery pack module 101 and enclosure 102 from a vantage point more clearly exhibiting the bottom 107 and features thereof, including support ribs 319.

Figure 3:
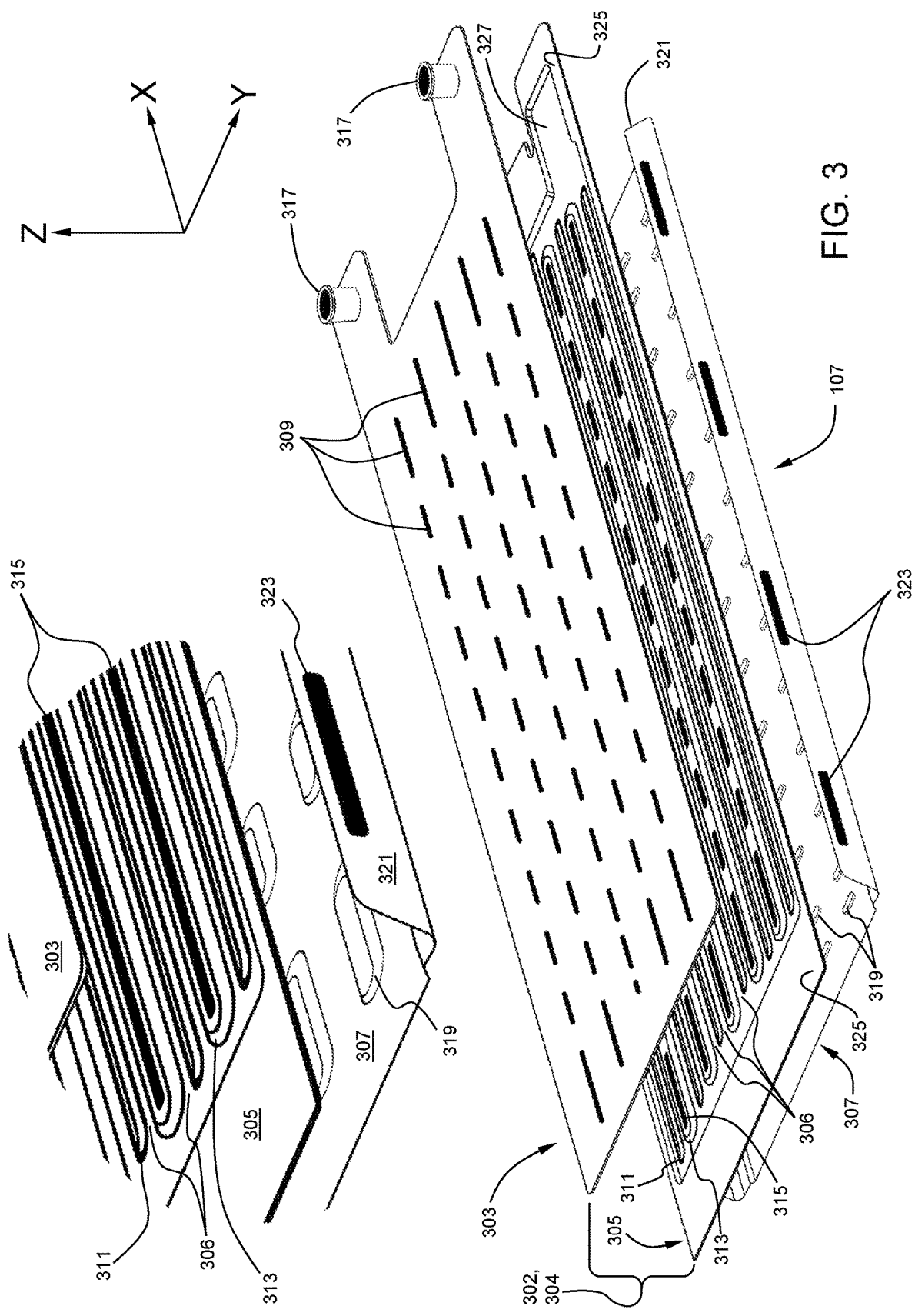
FIG. 3 illustrates disassembled views of alternative embodiments of bottom features of an exemplary battery pack module, in accordance with the present disclosure.
Figure 4:
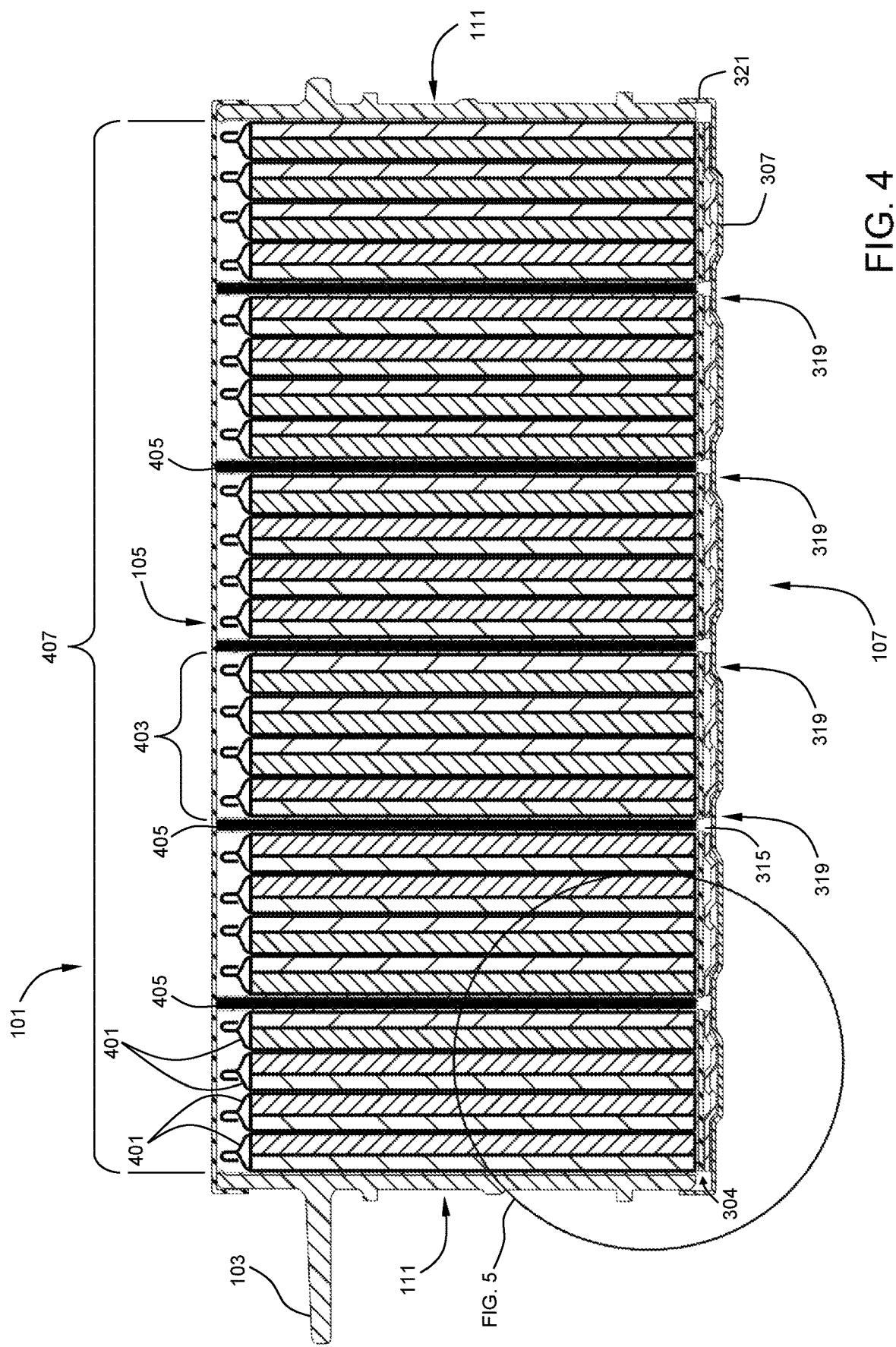
FIG. 4 illustrates a sectional view through a portion of an exemplary battery pack module, in accordance with the present disclosure.

FIG. 3 illustrates disassembled views of alternative embodiments of bottom features of an exemplary battery pack module. Bottom 107 of the battery pack module may include a heat sink 302 taking the form of a cooling plate 304 which may occupy an area between opposing sidewalls 111 of the battery pack module beneath a cell containment bay 407 (FIG. 4). In one embodiment, cooling plate 304 may include air cooling. In another embodiment, cooling plate 304 may include phase change material (PCM). For example, cooling plate 304 may be configured to envelope a PCM in bulk or to include a PCM-filled metal matrix. In another embodiment, cooling plate 304 may include a lower tray 305 and upper closeout plate 303. Tray 305 and closeout plate 303 are sealably joined together and define a volume therebetween and features which may include fluid flow channels 306 and fluid inlet and outlet couplings 317 to enable circulation of cooling fluid therethrough. In one embodiment, the volume may contain a PCM. In alternate embodiments, the volume may contain a circulated fluid, for example a liquid such as water/glycol or a gas such as air. In one embodiment, the volume may enclose a coolant circulation tube or refrigerant circulation tube. In one embodiment, tray 305 may include a tray bottom and a peripherally disposed, raised lip 325. The tray 305 and closeout plate 303 may be complementarily shaped to allow sealable joining around the perimeter of the tray at the raised lip. In one embodiment, the tray 305 may include a number of elongated first ribs 313 defining fluid flow channels 306 therebetween. First ribs 313 rise from the bottom 327 of tray 305. First ribs 313 of tray 305 and the closeout plate 303 may be complementarily shaped to allow sealable joining of the tops of the first ribs 313 to the closeout plate 303 thereby closing the fluid flow channels 306 cross sections bounded by adjacent first ribs 313, closeout plate and bottom 327 of tray 305. In one embodiment, a first set of first ribs 313 may include through slots 315 at the apex thereof and the closeout plate 303 may include complementary through slots 309. Sealable joints are made around the perimeter of such complementary through slots at the interface of the slotted first ribs 313 and the closeout plate 303. In one embodiment, slots in first ribs 313 and closeout plate may be multiple and discontinuous along the length of the first ribs 313. In an alternate embodiment, the slots in first ribs 313 and closeout plate may be singular and continuous along the length of the first ribs 313. A number of unslotted second ribs 311 may rise from the bottom 327 of tray 305 between the slotted first ribs 313. Second ribs 311 of tray 305 and the closeout plate 303 may be complementarily shaped to allow sealable joining of the tops of the second ribs 311 to the closeout plate 303 thereby closing the fluid flow channel 306 cross sections bounded by adjacent first and second ribs 313, 311, closeout plate and bottom 327 of tray 305. Bottom 107 of the battery pack module may further include a carrier 307 engaged with the tray 305 of cooling plate 304. In one embodiment, carrier 307 may include support ribs 319 which extend upwardly to engage with the underside of slotted first ribs 313. The support ribs may engage the slotted first ribs in the regions of the slots 315. Support ribs 319 may be elongated transverse to the elongated slotted first ribs 313 or elongated along the length of the slotted first ribs 313. Carrier 307 may include a pair of opposing attachment extensions 321 dimensioned to wrap to the outside or external to opposing sidewalls 111 of the battery pack module. Attachment extensions 321 may engage with the opposing sidewalls 111. In one embodiment, the attachment extensions 321 include attachment slots 323 to engage with ramped or barbed retention features (not shown) on the outside of opposing sidewalls 111.

In one embodiment, closeout plate 303 is a metal or metal alloy. In one embodiment, both closeout plate 303 and tray 305 are metal or metal alloy. In one embodiment, closeout plate 303 and tray 305 are manufactured from clad aluminum alloy sheet stock, for example Al 3003, which features acceptable strength, corrosion, and ductility characteristics. Slots and other dimensional features in closeout plate 303 and tray 305 may be punched, cut (such as by laser or water jet processes), or alternatively manufactured. Variable height features (e.g. ribs and lip) in tray 305 may be press formed, roll formed, hydroformed or alternatively manufactured.

Closeout plate 303 and tray 305 features may be sealably joined by any effective process including, for example brazing. Carrier 307 may be a dimensionally stable, high strength material, for example high strength steel. The features of the carrier (e.g. slots, ribs, corner breaks, etc.) may be formed by any appropriate metal working processes including those listed above with respect to the closeout plate 303 and tray 305. However, one having ordinary skill in the art will appreciate that high strength steel may be formed by progressive cold rolling processes.

Figure 5:
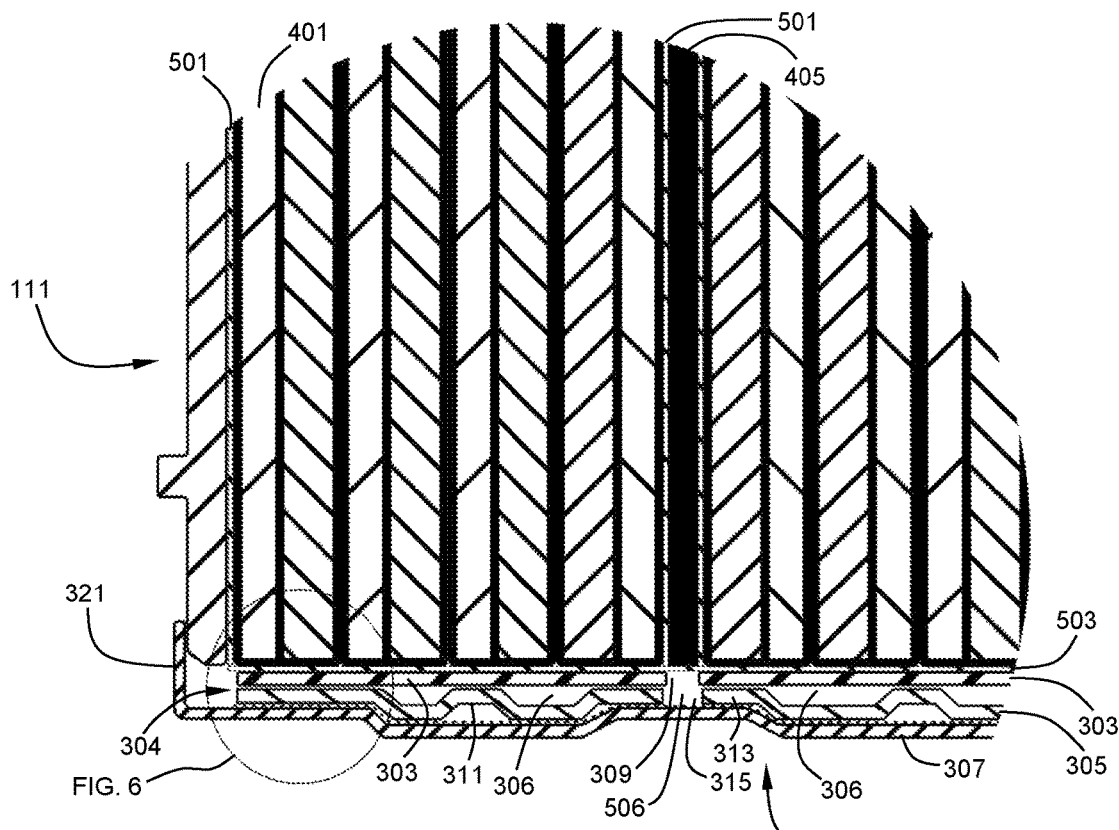
FIG. 5 illustrates a detailed sectional view of the highlighted portion of the sectional view of FIG. 4, in accordance with the present disclosure.
Figure 6:
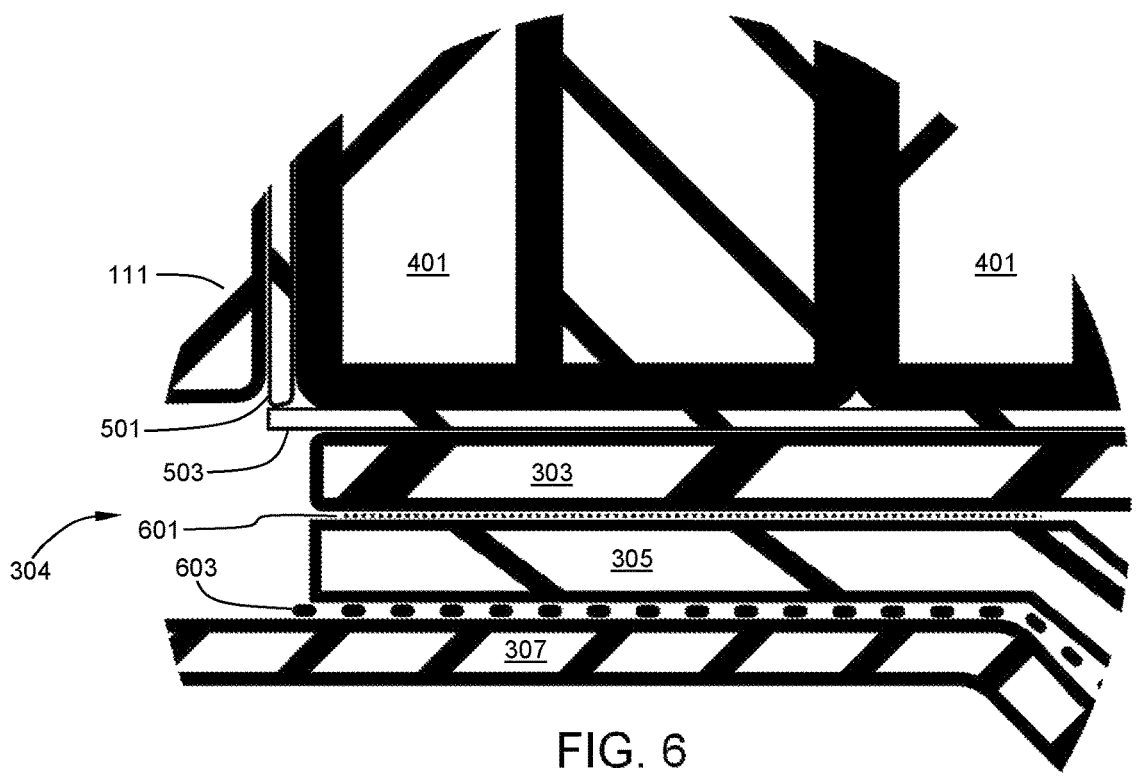
FIG. 6 illustrates a detailed sectional view of the highlighted portion of the detailed sectional view of FIG. 5, in accordance with the present disclosure.

FIG. 4 illustrates a sectional view through a portion of an exemplary battery pack module 101 as denoted by the section plane 4-4 (dashed lines) viewed in the direction of the arrows along the X-axis shown in FIG. 1. FIGS. 5 and 6 are more detailed views of specific regions of FIG. 4 and FIG. 5, respectively, as called out in each of those FIGS. The following description makes reference to FIGS. 4-6. The pair of opposing sidewalls 111 partially define therebetween a cell containment bay 407 which may be further subdivided defining a plurality of cell chambers 403 wherein each cell chamber includes at least one cell 401. In one embodiment, each cell 401 is a lithium-ion cell; however, other cell chemistries may be employed within the scope of the present disclosure. In one embodiment the cells 401 are pouch cells. Alternative cells, including prismatic and cylindrical cells may be employed within the scope of the present disclosure. Each adjacent cell chamber 403 is separated from the other by a thermal barrier 405, for example an aerogel. An electrical insulator 501 may be disposed on each side of the thermal barrier 405 and between the sidewalls 111 and the adjacent cell chamber 403. The cooling plate 304 is located at the bottom of the battery pack module 101 and partially defines the cell chambers 403 and cell containment bay 407. Each cell 401 may be in thermal contact with the closeout plate 303 of the cooling plate 304. An intervening thermally conductive medium, such as thermal paste or adhesive 503, may be employed to beneficially bridge gaps and take up irregularities between the cells 401 and closeout plate 303. The regions between the spaced adjacent cell chambers 403 align with the thermal breaks 506 defined by the slots 315, 309 through the tray 305 ribs 313 and closeout plate 303, respectively. Such arrangement beneficially minimizes thermal transfer between adjacent cell chambers through the cooling plate 304. Braze joint 601 is illustrated in FIG. 6 between closeout plate 303 and tray 305 at the peripheral lip. Other sealed joints between interfaces of the tray 305 and closeout plate may have similar braze joints. Structural adhesive 603, for example a thermally resistant, air-cured polyurethane, may secure the carrier 307 to the tray 305.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure references exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A battery pack module, comprising:
    a plurality of cell chambers comprising space for cells wherein adjacent ones of the plurality of cell chambers are separated by a respective thermal barrier, each of the plurality of cell chambers containing at least one cell; and
    a heat sink partially defining the plurality of cell chambers and thermally coupled with each cell, the heat sink comprising elongated thermal breaks in regions between adjacent ones of the plurality of cell chambers, the heat sink comprising:
    a tray comprising a bottom and a peripheral raised lip, a plurality of first elongated ribs rising from the bottom of the tray, each of the plurality of first elongated ribs including a respective length and a respective plurality of elongated slots therethrough that are discontinuous along the respective length providing elongated thermal breaks by discontinuity of the tray, the plurality of elongated slots through the plurality of first elongated ribs being elongated in the same direction as the plurality of first elongated ribs; and
    a thermally conductive closeout plate comprising an outer surface and complementarily shaped inner surfaces interfacing with the tray at the peripheral raised lip and the plurality of first elongated ribs, the closeout plate including elongated slots through the closeout plate substantially aligned with the plurality of elongated slots through the plurality of first elongated ribs of the tray providing elongated thermal breaks by discontinuity of the closeout plate, the elongated slots through the closeout plate being elongated in the same direction as the plurality of first elongated ribs;
    wherein channels are defined between adjacent ones of the plurality of first elongated ribs, the channels being directionally aligned with the plurality of first elongated ribs of the tray and the respective elongated slots through the closeout plate and through the plurality of first elongated ribs of the tray.

2. The battery pack module of claim 1, wherein the channels are fluid flow channels and the heat sink comprises a fluid circulating cooling plate.

3. The battery pack module of claim 2, comprising:
    a carrier secured to the fluid circulating cooling plate in regions between adjacent ones of the fluid flow channels adjacent the elongated thermal breaks.

4. The battery pack module of claim 1, wherein the at least one cell comprises at least one of a pouch cell, a prismatic cell and a cylindrical cell.

5. The battery pack module of claim 1, wherein the thermal barrier comprises an aerogel.

6. The battery pack module of claim 1, wherein a thermal adhesive bonds the heat sink with each cell.

7. The battery pack module of claim 1, further comprising a pair of opposing sidewalls partially defining therebetween the plurality of cell chambers and a carrier located on a side of the heat sink opposite the plurality of cell chambers and secured to the heat sink adjacent the elongated thermal breaks, the carrier further comprising a pair of opposing attachment extensions wrapping outside surfaces of the opposing sidewalls and engaged thereto.

8. The battery pack module of claim 7, wherein a structural adhesive secures the carrier to the heat sink.

9. The battery pack module of claim 1, further comprising a carrier secured to the heat sink in regions between adjacent ones of the channels adjacent the elongated thermal breaks.

10. The battery pack module of claim 1, wherein the channels contain a phase change material.

11. A battery pack module, comprising:
   a pair of opposing sidewalls partially defining therebetween a cell containment bay; and
   a cooling plate partially defining the cell containment bay between the opposing sidewalls, comprising
   a tray comprising a bottom and a peripheral raised lip, a plurality of first elongated ribs each having a length rising from the bottom of the tray, the plurality of first elongated ribs including elongated slots therethrough that are discontinuous along the length providing elongated thermal breaks by discontinuity of the tray, the elongated slots through the plurality of first elongated ribs being elongated in the same direction as the plurality of first elongated ribs;
   a thermally conductive closeout plate comprising an outer surface and complementarily shaped inner surfaces interfacing with the tray at the peripheral raised lip and the plurality of first elongated ribs, the closeout plate including elongated slots through the closeout plate substantially aligned with the elongated slots through the plurality of first elongated ribs of the tray providing elongated thermal breaks by discontinuity of the closeout plate, the elongated slots through the closeout plate being elongated in the same direction as the plurality of first elongated ribs; and
   first fluid impervious seals at the interfaces of the inner surfaces of the closeout plate and the peripheral raised lip and the plurality of first elongated ribs of the tray;
   wherein fluid flow channels are defined between adjacent plurality of first elongated ribs, the fluid flow channels being directionally aligned with the plurality of first elongated ribs of the tray and the respective elongated slots through the closeout plate and through the plurality of first elongated ribs of the tray.

12. The battery pack module of claim 11, wherein the cooling plate further comprises:
   the tray comprising a plurality of second elongated ribs interposed between adjacent ones of the plurality of first elongated ribs, directionally aligned with the plurality of first elongated ribs, and rising from the bottom of the tray;
   the thermally conductive closeout plate comprising complementarily shaped inner surfaces interfacing with the tray at the plurality of second elongated ribs; and
   second fluid impervious seals at the interfaces of the inner surfaces of the closeout plate and the plurality of second elongated ribs of the tray;
   wherein the fluid flow channels are further defined between adjacent ones of the plurality of first elongated ribs and the plurality of second elongated ribs.

13. The battery pack module of claim 12, wherein the tray and the closeout plate comprise metal and the first and second fluid impervious seals comprise braze joints.

14. The battery pack module of claim 12, further comprising a carrier located on a side of the cooling plate opposite the cell containment bay and secured to the cooling plate adjacent the elongated thermal breaks, the carrier further comprising a pair of opposing attachment extensions wrapping outside surfaces of the opposing sidewalls and engaged thereto.

15. The battery pack module of claim 11, wherein the cell containment bay comprises a plurality of cell chambers, wherein adjacent ones of the plurality of cell chambers are separated by a respective thermal barrier, the thermal barriers being aligned with the elongated slots through the closeout plate and the plurality of first elongated ribs of the tray.

16. The battery pack module of claim 15, wherein the cooling plate further comprises:
   the tray comprising a plurality of second elongated ribs interposed between adjacent ones of the plurality of first elongated ribs, directionally aligned with the plurality of first elongated ribs, and rising from the bottom of the tray;
   the thermally conductive closeout plate comprising complementarily shaped inner surfaces interfacing with the tray at the plurality of second elongated ribs; and
   second fluid impervious seals at the interfaces of the inner surfaces of the closeout plate and the plurality of second elongated ribs of the tray;
   wherein the fluid flow channels are further defined between adjacent ones of the plurality of first elongated ribs and the plurality of second elongated ribs.

17. The battery pack module of claim 11, further comprising a carrier located on a side of the cooling plate opposite the cell containment bay and secured to the cooling plate adjacent the elongated thermal breaks, the carrier further comprising a pair of opposing attachment extensions wrapping outside surfaces of the opposing sidewalls and engaged thereto.

18. The battery pack module of claim 17, wherein a structural adhesive secures the carrier to the cooling plate.

\* \* \* \* \*